US009686598B2

(12) United States Patent
Siddhaye et al.

(10) Patent No.: US 9,686,598 B2
(45) Date of Patent: Jun. 20, 2017

(54) POWER OVER ETHERNET ELECTRICAL TO OPTICAL INTERFACE CONVERTER

(71) Applicant: Juniper Networks, Inc., Sunnyvale, CA (US)

(72) Inventors: Shreeram Siddhaye, Sunnyvale, CA (US); Boris Reynov, Cupertino, CA (US); Jack Kohn, Mountain View, CA (US); Euan F. Mowat, Concord, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 25 days.

(21) Appl. No.: 14/733,590

(22) Filed: Jun. 8, 2015

(65) Prior Publication Data

US 2015/0304742 A1 Oct. 22, 2015

Related U.S. Application Data

(63) Continuation of application No. 12/862,494, filed on Aug. 24, 2010, now Pat. No. 9,052,482.

(51) Int. Cl.
*G02B 6/42* (2006.01)
*H04L 12/10* (2006.01)
(Continued)

(52) U.S. Cl.
CPC ....... *H04Q 11/0003* (2013.01); *G02B 6/4246* (2013.01); *G02B 6/4293* (2013.01);
(Continued)

(58) Field of Classification Search
None
See application file for complete search history.

(56) References Cited

U.S. PATENT DOCUMENTS 6,204,948 B1 *  3/2001  Coffey ................ H04B 10/502
                                                    375/258
6,898,276 B1 *  5/2005  Millet ..................... H04L 29/06
                                                    379/219

(Continued)

OTHER PUBLICATIONS

MiniMc Media Converter by IMC Networks, "MiniMc Switching Fiber Converters," http://www.imcnetworks.com/Products/product.cfm?family=28, printed on Aug. 24, 2010, 2 pages.

(Continued)

*Primary Examiner* — Michelle R Connelly
(74) *Attorney, Agent, or Firm* — Harrity & Harrity, LLP

(57) ABSTRACT

A portable, self-powered, interface converter for converting between Ethernet over twisted pair cables and Ethernet over optical fiber is described. In one implementation, the device may include a first interface to a power-over-Ethernet connection and a second interface to provide a connection to receive fiber optic cabling. A power-over-Ethernet (PoE) circuit may derive power from the PoE connection and output a corresponding power signal. A transcoder may perform physical layer conversion between Ethernet communications over twisted pair cabling connected to the first interface and Ethernet communications over the fiber optic cabling. The transcoder may be powered by the power signal output by the PoE circuit.

20 Claims, 6 Drawing Sheets

(51) Int. Cl.
*H04B 10/80* (2013.01)
*H04Q 11/00* (2006.01)
*H04B 10/40* (2013.01)

(52) U.S. Cl.
CPC ........... *H04B 10/40* (2013.01); *H04B 10/808* (2013.01); *H04L 12/10* (2013.01)

(56) References Cited

U.S. PATENT DOCUMENTS

| | | | | |
|---|---|---|---|---|
| 7,331,819 | B2* | 2/2008 | Nelson | G02B 6/4201 385/88 |
| 7,445,389 | B2* | 11/2008 | Aronson | G02B 6/4292 385/88 |
| 8,180,225 | B2* | 5/2012 | Werthen | G06F 13/385 398/135 |
| 8,295,702 | B2* | 10/2012 | Katayama | H04B 10/27 398/58 |
| 9,052,482 | B1 | 6/2015 | Siddhaye et al. | |
| 2002/0044746 | A1* | 4/2002 | Kronlund | H04B 10/2504 385/53 |
| 2003/0135601 | A1 | 7/2003 | Pozzuoli | |
| 2004/0247313 | A1* | 12/2004 | Tanaka | H04L 12/4625 398/25 |
| 2007/0058666 | A1* | 3/2007 | Pratt | H04L 12/10 370/463 |
| 2008/0267554 | A1* | 10/2008 | Thompson | H01R 4/2433 385/2 |
| 2009/0196621 | A1* | 8/2009 | Chen | G06F 13/4027 398/115 |
| 2010/0178054 | A1* | 7/2010 | Cain | H04L 69/08 398/58 |
| 2011/0228845 | A1 | 9/2011 | Banerjee | |

OTHER PUBLICATIONS

Elinx Industrial Ethernet Media Converters from B&B Electronics Manufacturing Co Inc., "B&B Electronics Manufacturing Co. Inc.—Elinx Industrial Ethernet Media Converters," http://www.globalspec.com/FeaturedProducts/Detail/BandBElectronics/Elinx__Industrial__Ethernet__Media__Converters, printed on Aug. 24, 2010, 1 page.

* cited by examiner

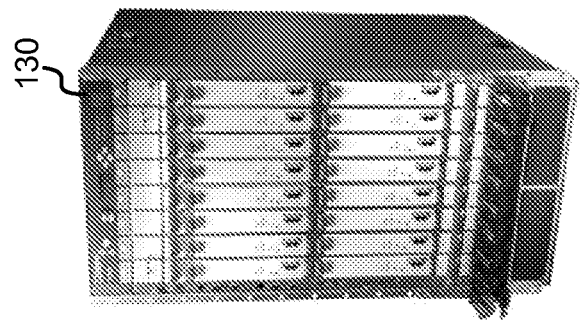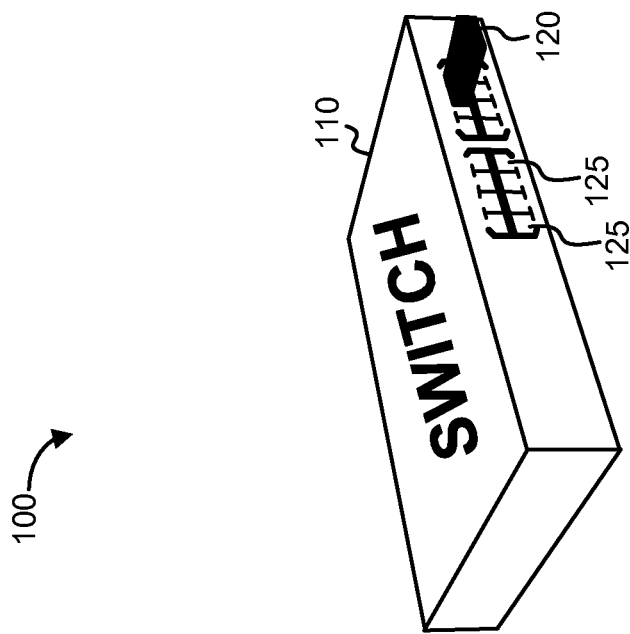
Fig. 1

POWER OVER ETHERNET ELECTRICAL TO OPTICAL INTERFACE CONVERTER

RELATED APPLICATION

This application is a continuation of U.S. patent application Ser. No. 12/862,494, filed Aug. 24, 2010, (now U.S. Pat. No. 9,052,482) which is incorporated herein by reference.

BACKGROUND

Computing and communication networks typically include devices, such as routers, switches or gateways, which transfer or switch data, such as packets, from one or more sources to one or more destinations. A packet is a structure that encapsulates data for transmission through a network based on control information that is stored in a header portion of the packet.

A network switch, in particular, may include a networking device that connects network segments and computing devices. Output ports for network switches are frequently connected using twisted-pair copper wires to form the physical layer for packet transmission. The Ethernet protocol is typically used to implement the data link layer over the physical layer. The Ethernet protocol can, however, also provide a data link layer over other physical layers, such as optical fiber or twisted pair cable. One type of implementation of a port designed to support Ethernet over twisted pair cable also includes a way to supply power to the connected device over the same cable. This type of port is called Power-over-Ethernet (PoE) port, and is defined by IEEE standard 802.3.

SUMMARY

One implementation includes a device comprising a first interface to provide a PoE connection; an optic interface; and a PoE circuit to derive power from the PoE connection and to output a corresponding power signal. The device may further include a transcoder to provide physical layer conversion between Ethernet communications over the twisted pair cabling connected to the first interface and Ethernet communications over the optic interface. The transcoder may be powered by the power signal output by the PoE circuit.

In another implementation, a device may include a first interface for connecting to electrical signals communicated over wires; an optic interface; a PoE circuit to process the electrical signals received at the first interface and to output, based on the electrical signals received at the first interface, a power signal; and a transcoder to provide conversion between Ethernet-over-copper interface signals communicated with the first interface and Ethernet-over-fiber signals communicated with the optic interface, the transcoder being powered by the power signal output by the PoE circuit.

In another implementation, a device may include first means for accepting a connection for a twisted pair Ethernet connector; second means for accepting a connection for an optical fiber connector; means for isolating, from signals received at the first means for accepting, a power signal and data signals, where the power signal and the data signals are received over shared twisted pair cabling at the first means for accepting; and means for transcoding to provide physical layer conversion between Ethernet communications at the first means for accepting and Ethernet communications at the second means for accepting, the means for transcoding being powered by the power signal output from the means for isolating.

BRIEF DESCRIPTION OF THE DRAWINGS

The accompanying drawings, which are incorporated in and constitute a part of this specification, illustrate one or more implementations described here and, together with the description, explain these implementations. In the drawings:

FIG. 1 is a diagram of an exemplary system in which concepts described herein may be implemented;

DETAILED DESCRIPTION

Figure 2:
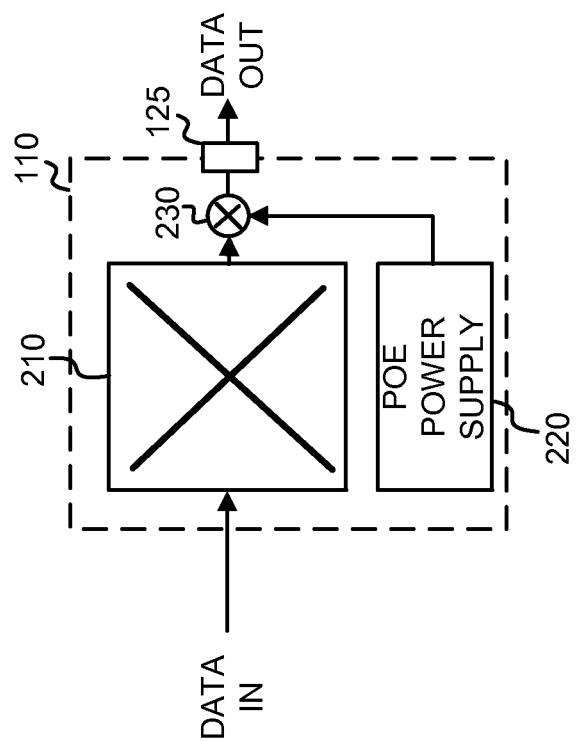
FIG. 2 is a diagram of exemplary components of a switch shown in FIG. 1.

The following detailed description of the invention refers to the accompanying drawings. The same reference numbers in different drawings may identify the same or similar elements. Also, the following detailed description does not limit the invention.

As described herein, an interface converter may implement an adapter between different physical layer connections, such as between a modular connector (e.g., an RJ45 jack) that is connected using twisted-pair copper cable, and optical fibers. The interface converter may be powered by power received from a PoE port. In particular, the interface converter may be connected to a network device that includes the ability to provide power-over-Ethernet (PoE) connections. The interface converter may thus not require any additional power connections. The interface converter may be relatively small, such as on the order of a few inches, and may be designed to plug directly into a PoE-enabled network device.

Exemplary System Overview

FIG. 1 is a diagram of an exemplary system 100 in which concepts described herein may be implemented. System 100 may include a switch 110, an interface converter 120, and a network device 130.

Switch 110 may include a network switch designed to connect segments of a network. As used herein, the term "switch" broadly refers to a device used to connect network segments, and may include, for example, a router, a switch, a hub, and/or a repeater. Switch 110 may process and route data at the data link layer (layer 2) or network layer (layer 3 and above) of the Open System Interconnection (OSI) model. Switch 110 may include a number of output ports, labeled as ports 125. Ports 125 may particularly include Ethernet ports designed to accept 8P8C connectors (also called RJ-45 connectors) that implement twisted pair wiring ("twisted pair Ethernet cabling") for the physical connection. Ethernet twisted pair connections are frequently implemented using insulated pairs of copper wire, in which signals are transmitted over the twisted pair copper wiring as differential electrical signals.

Switch 110 may implement PoE connections. PoE is a known standard for passing electrical power, along with data, on twisted pair Ethernet cabling. Switch 110 may "inject" power to the twisted pair Ethernet cabling connected at ports 125. In one implementation of the PoE standard, up to 15.4 watts of direct current (DC) power may be provided at each output port. PoE may be particularly useful for powering Ethernet devices without having to connect the Ethernet devices to a separate power supply.

Consistent with aspects described herein, interface converter 120 may be a device that includes a first interface for connecting to a port of switch 110. Interface converter 120 may include a second interface for connecting to an optical fiber. Interface converter 120 may convert signals between the first interface (twisted pair Ethernet cabling) and the second interface (Ethernet over optical fiber). Interface converter 120 may be relatively small (e.g., approximately 1.25"×4"×1") and may be powered using PoE. Accordingly, interface converter 120 may act as portable device that users can quickly install and remove to provide on demand conversion between twisted pair Ethernet and optical Ethernet connections. Interface converter 120 will be described in more detail below.

Network device 130 may include a device that includes an optical interface. As shown in exemplary system 100, network device 130 may be a router, such as a high capacity router. In general, a router may be a networking device that includes software and hardware tailored for the tasks of routing and forwarding information. Routers may connect two or more logical network subnets and are frequently said to perform "layer 3 switching." Network device 130 may include one or more insertable cards that may provide interfaces, such as an optical Ethernet interface, through which the network device can connect to external devices.

Switch 110

FIG. 2 is a diagram of exemplary components of switch 110. As previously mentioned, switch 110 may be a PoE device, in which cables connected to output ports 125 are supplied with electrical power as well as data that is to be transmitted. Switch 110 may particularly include switching logic 210, a PoE power supply 220, and a mixer 230.

Switching logic 210 may include software and hardware designed to switch incoming data units ("DATA IN"), such as packets or frames of data, to a desired output port of switch 110 ("DATA OUT"). Switch logic 210 may, for example, implement switching protocols to build forwarding tables that map frames to output ports based on media access control (MAC) addresses received in the frames.

PoE power supply 220 may generate power that is to be supplied over the cabling connected to one or more of ports 125. PoE power supply 220 may provide a DC output of 44-57 volts. In the PoE standard, different modes are available for supplying power. In one mode, for example, one set of pins are used to form one side of a 48 volt DC transmission and another set of pins provide an opposite polarity signal. Because Ethernet data sent over a twisted pair cable is specified using differential data transmission over each pair with transformer coupling, the Ethernet data may still be transmitted over the same pins.

Mixer 230 may combine the data signals from switch 210 and the power signal from PoE power supply 220 to obtain the output of switch 110. The output may include Ethernet over standard twisted pair cabling in which power is additionally supplied.

Interface Converter

Figure 3:
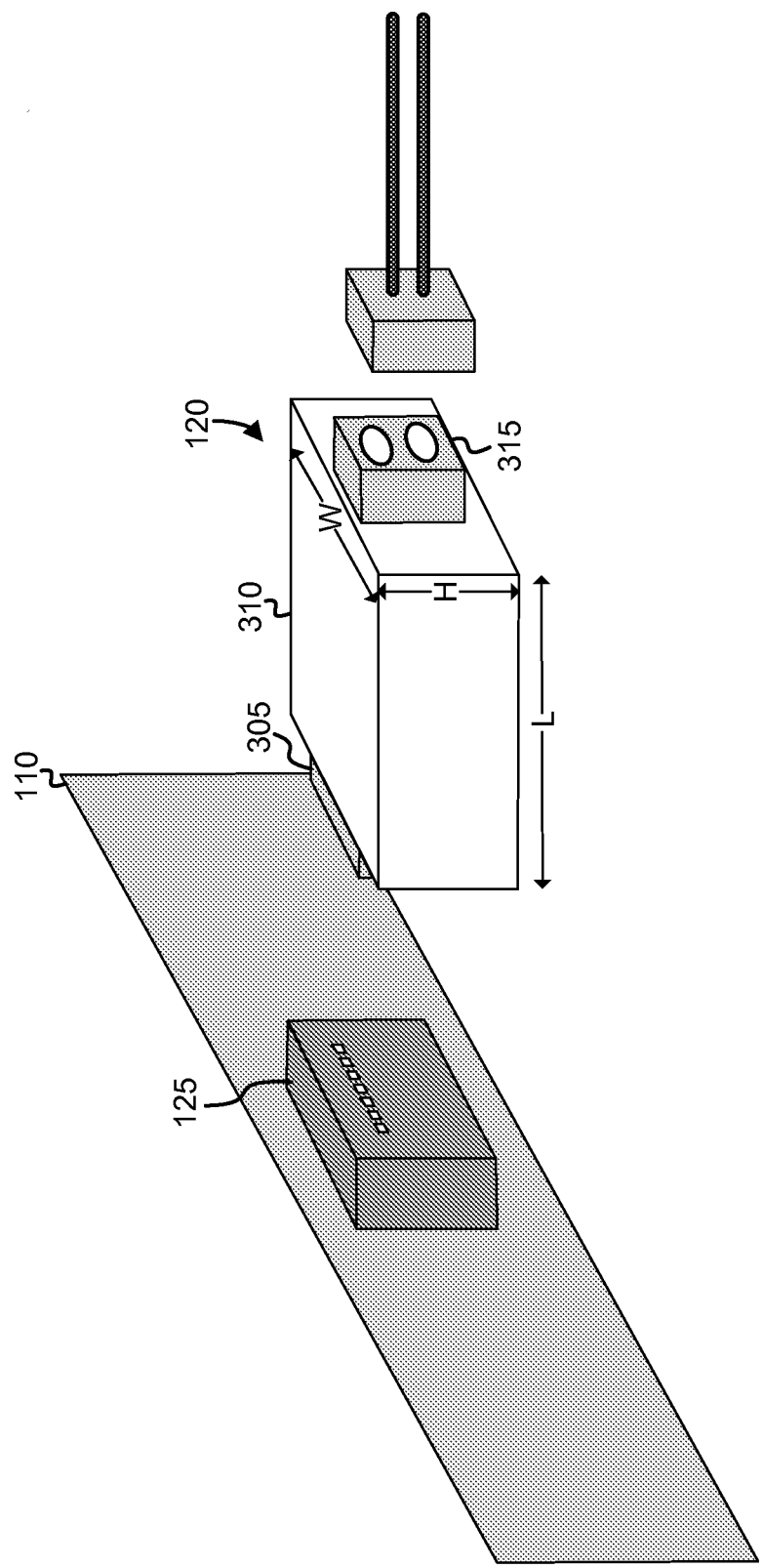
FIG. 3 is a diagram illustrating a perspective view of an exemplary implementation of an interface converter shown in FIG. 1.

FIG. 3 is a diagram illustrating a perspective view of an exemplary implementation of interface converter 120. As shown, interface converter 120 may include a first interface 305, a body 310, and a second interface 315. First interface 305 and second interface 315 may be placed at opposite ends of body 310. First interface 305 may be an RJ-45, or other connector type, for providing connections to twisted pair PoE cabling. Body 310 may be a housing that includes electronics of interface converter 120. Second interface 315 may include an interface into which a fiber optic cable or transceiver can be inserted. In one implementation, second interface 315 may include an optical connector into which a fiber optic cable may be inserted. In another possible implementation, second interface 315 may include a slot or cage into which a standardized transceiver may be inserted.

A number of fiber transceivers are standardized and may be used in body 310, such as SFP, GBIC, and MT-RJ. Second interface 315 may thus present a pluggable receptacle into which the user can insert a compatible optical transceiver (e.g., an SFP, GBIC, or MT-RJ optical transceiver). Second interface 315 and/or body 310 may interface may include a slot, such as an appropriate cage connector, designed to accept the optical transceiver (e.g., a SFP, GBIC, or MT-RJ optical transceiver).

In one exemplary implementation, body 310 may be, for example, approximately 6" long (L), 1.5" high (H), and 1" wide (W). Body 310 may be formed of, for example, a plastic or metal encasing. Interface component 120 may be particularly designed to be portable and may be turned on by simply plugging first interface 305 into port 125 of switch 110 and by plugging second interface 315 into a fiber optic cable.

Figure 4:
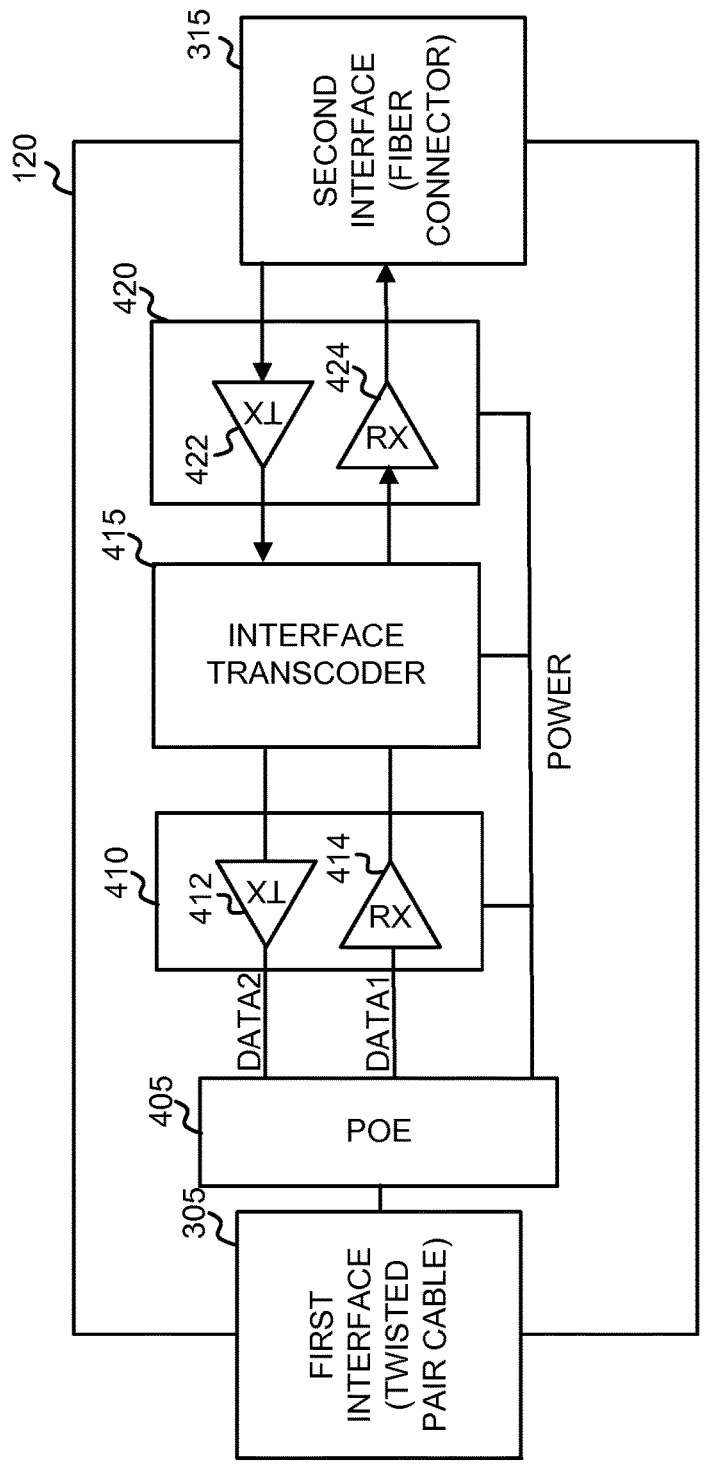
FIG. 4 is a diagram illustrating an exemplary implementation of the electronic elements of the interface converter shown in FIG. 1.

FIG. 4 is a diagram illustrating an exemplary implementation of the electronic elements of interface component 120, such as those within body 310. As shown, interface component 120 may include first interface 305 (e.g., RJ-45 jack), a PoE circuit 405, an electrical transceiver 410, an interface transcoder 415, an optical transceiver 420, and second interface 315.

PoE circuit 405 may separate/combine the power supplied over the PoE cabling from the data signals. For signals received from first interface 305, PoE circuit 405 may electrically isolate the electronic logic of interface converter 120 (i.e., electrical transceiver 410, interface transcoder 415, and/or optical transceiver 420) and the supplied power (POWER). PoE circuit 405 may provide a power (POWER) out signal, such as a 3.3 volt signal that is supplied to electrical transceiver 410, interface transcoder 415, and optical transceiver 420.

PoE circuit 405 may include circuitry to derive, from a high voltage signal (e.g., 48 volts), received at first interface 305, the power out signal. PoE circuit 405 may also supply data signals (DATA1) to electrical transceiver 410, representing the information received at first interface 305. For signals outgoing to first interface 305, PoE circuit 405 may receive and output the data signals (DATA2) over the Ethernet cabling. Circuits for isolating the power supplied over PoE signals from the normal Ethernet signals are generally known in the art and will not be described further herein.

Electrical transceiver 410 may include a transmitter 412 (TX) and a receiver 414 (RX). Transmitter 412 may receive electrical Ethernet signals from interface transcoder 415 and propagate the signal to PoE circuit 405. Transmitter 412 may amplify and/or filter its incoming signal to a level appropriate for PoE circuit 405 or for transmitting of the signal over first interface 305. Receiver 414 may similarly receive electrical Ethernet signals from PoE circuit 405 and propagate the signals to interface transcoder 415. Receiver 414 may amplify and/or filter its incoming signal to a level appropriate for processing by interface transcoder 415. In some implementations, the electrical transceiver 410 may be omitted or the functionality of electrical transceiver 410 may be included in the implementation of interface transceiver 415.

Interface transcoder 415 may provide conversion, such as a digital-to-digital conversion, between optical and electrical (e.g., copper wire) connections. Interface transcoder 415 may connect to transceiver 410 and optical transceiver 420 using wired (e.g., copper) connections. Interface transcoder 415 may provide physical layer (PHY) conversion between the signals to/from Ethernet-over-copper interface (from transceiver 410) and signals to/from Ethernet-over-fiber interface (from transceiver 420). Optical transceiver 420 may include a transmitter 422 (TX) and a receiver 424 (RX). Receiver 424 may receive electrical signals from interface transcoder 415 and propagate an optical signal to second interface 315. Transmitter 422 may similarly receive optical signals from second interface 315 and propagate an electrical signal to interface transcoder 415. In some implementations, optical transceiver 420 may be omitted or the functionality of optical transceiver 420 may be included in the implementation of interface transceiver 415. For example, in the situation in which second interface 315 may receive an insertable optical transceiver, the inserted optical transceiver may include the functionality of optical transceiver 420.

In operation, interface converter 120 may convert incoming Ethernet over twisted pair cabling signals to Ethernet over optical fiber, and vice versa. Because interface converter 120 does not require a separate power connection and is relatively small, installing interface converter 120 in a variety of field conditions can be particularly straight forward.

Although FIG. 4 shows exemplary components of interface converter 120, in other embodiments, interface converter 120 may contain fewer, different, differently arranged, or additional components than depicted in FIG. 4.

Figure 5:
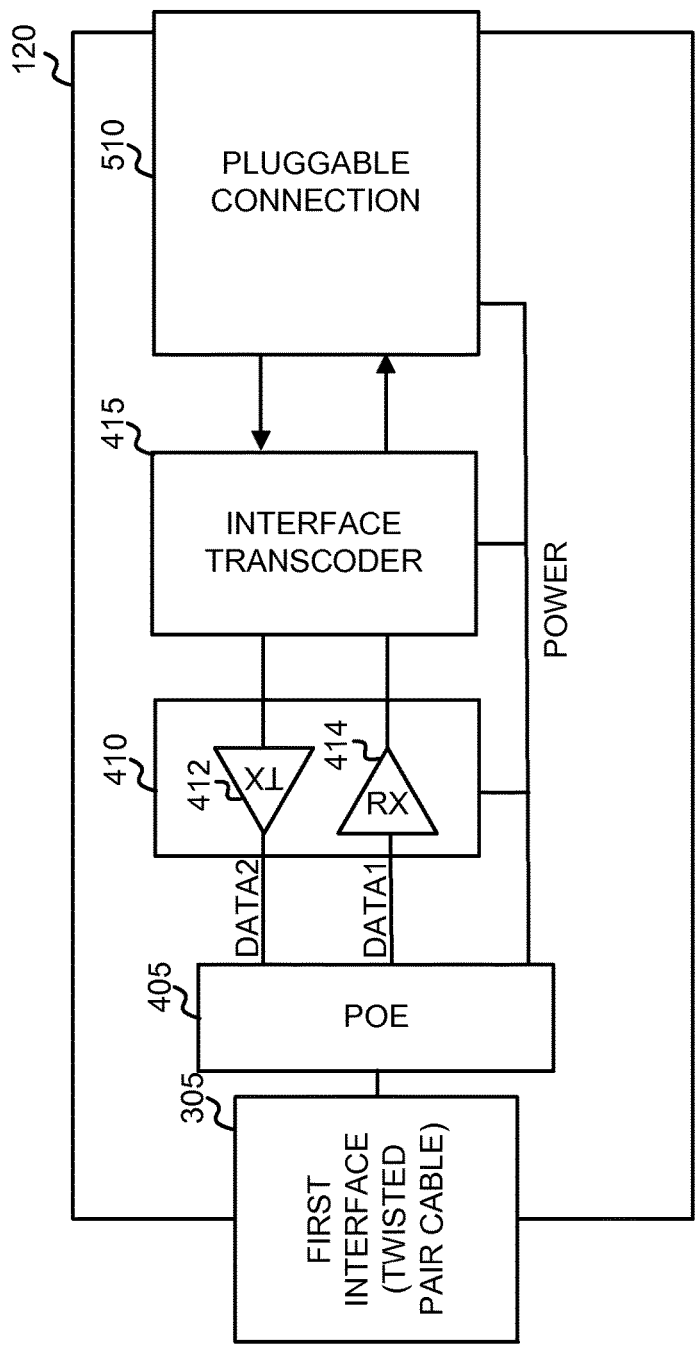
FIG. 5 is a diagram illustrating an example of implementation of the interface converter shown in FIG. 1.

FIG. 5 is a diagram illustrating an example of one example implementation of interface converter 120 in which a pluggable connector can be inserted into interface converter.

Interface converter 120, as shown in FIG. 5, may be similar to the interface converter shown in FIG. 4. In particular, interface converter 120 may include first interface 305, PoE circuit 405, electrical transceiver 410, and interface transcoder 415. Interface converter 120, as shown in FIG. 5, may additionally include pluggable connection 510.

Pluggable connection 510 may include a slot, cage or other receptacle into which a user may insert a pluggable optical transceiver, such as an SFP (small form-factor pluggable), GBIC (gigabit interface converter), or mini-GBIC. The optical transceiver may include both an optical transceiver and a optical fiber connector. A user may insert a desired optical transceiver. In relation to interface converter 120, as shown in FIG. 4, the user-inserted optical transceiver may perform the functions of optical transceiver 420 and second interface 315.

Figure 6:
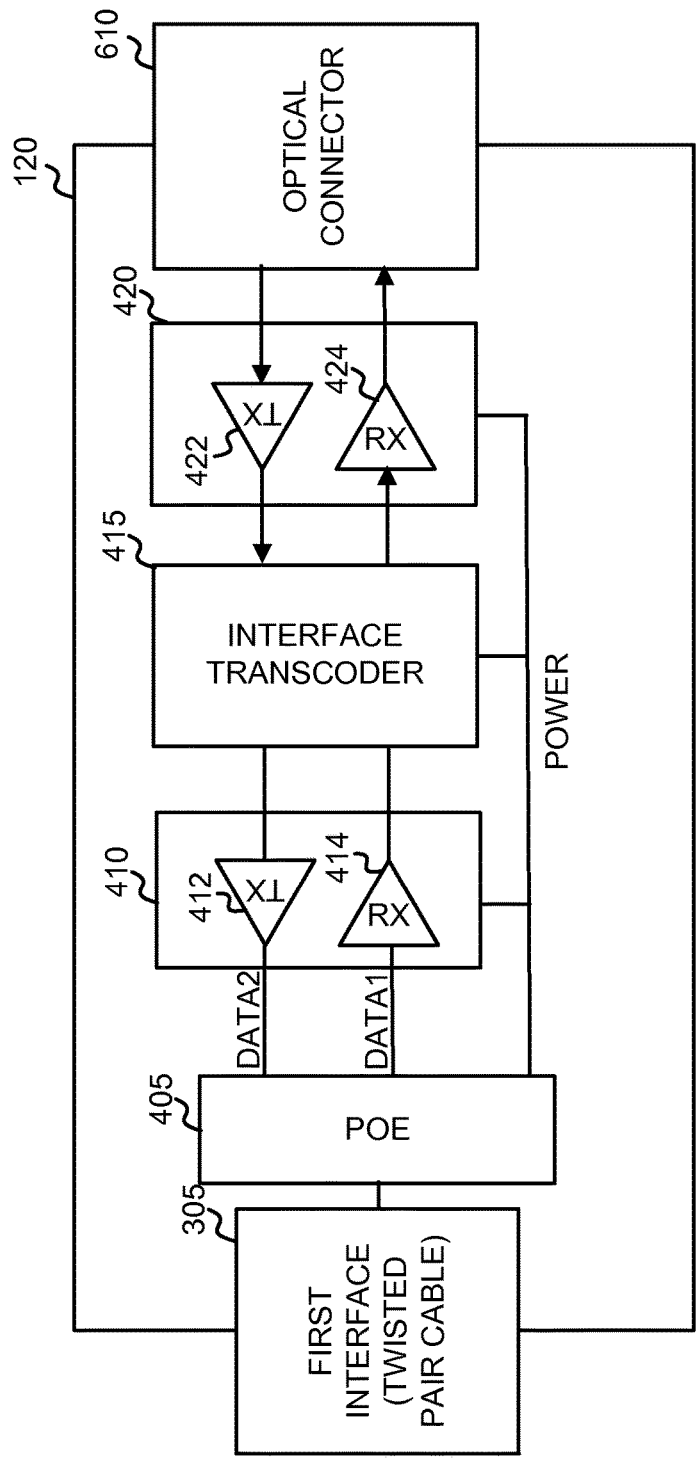
FIG. 6 is a diagram illustrating an example of another implementation of the interface converter shown in FIG. 1.

FIG. 6 is a diagram illustrating an example of another implementation of interface converter 120. Interface converter 120, as shown in FIG. 6, may be similar to the interface converter shown in FIG. 4. In particular, interface converter 120 may include first interface 305, PoE circuit 405, electrical transceiver 410, interface transcoder 415, and optical transceiver 420.

Interface converter 120, as shown in FIG. 6, may support optical connector 610, such as an LC or SC form factor connector. LC and SC form factor optical connectors are known connectors that are used to terminate the end of an optical fiber. In general, an optical connector may mechanically couple and align the cores of fibers so that light can pass.

Optical transceiver 420, as illustrated in FIG. 6, may include a transceiver that performs optical-to-electrical conversion at one or more predetermined wavelengths. Optical transceiver 420 may be powered by the power output from POE 405.

CONCLUSION

A portable, self-powered, electrical to optical interface converter was described herein.

Certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device comprising:
   a power-over-Ethernet (PoE) circuit,
      the PoE circuit to provide power, via a pluggable connection, to an optical transceiver;
   an electrical transceiver connected to the PoE circuit,
      the electrical transceiver including a transmitter and a receiver,
         the transmitter to:
            amplify or filter a first signal for the PoE circuit, and
            propagate the first signal to the PoE circuit, and
         the receiver to propagate a second signal from the PoE circuit; and
   a transcoder connected to the transmitter and the receiver of the electrical transceiver, the receiver to amplify or filter the second signal for processing by the transcoder.

2. The device of claim 1, further comprising the pluggable connection to receive the optical transceiver.

3. The device of claim 1, where the transmitter is a first transmitter and the receiver is a first receiver; and
where the optical transceiver includes:
a second transmitter to provide an electrical signal to the transcoder, and
a second receiver to receive an electrical signal from the transcoder.

4. The device of claim 3, further comprising an interface connected to the PoE circuit.

5. The device of claim 1, where the pluggable connection is to receive a pluggable optical transceiver,
the pluggable optical transceiver including an optical transceiver and a optical fiber connector.

6. The device of claim 1, where the transmitter is a first transmitter and the receiver is a first receiver; and
where the optical transceiver includes:
a second transmitter to receive an optical signal from an interface, and
a second receiver to provide an optical signal to the interface.

7. The device of claim 1, where the pluggable connection comprises a slot to receive the optical transceiver.

8. The device of claim 1, where the transmitter is a first transmitter and the receiver is a first receiver; and
where the optical transceiver includes:
a second transmitter to:
receive an optical signal from an interface, and
provide an electrical signal to the transcoder, and
a second receiver to:
receive an electrical signal from the transcoder, and
provide an optical signal to the interface.

9. A device comprising:
a power-over-Ethernet (PoE) circuit,
the PoE circuit to provide power, via a pluggable connection, to an optical transceiver circuit;
an electrical transceiver connected to the PoE circuit,
the electrical transceiver including a first transmitter and a first receiver,
the first transmitter to:
amplify or filter a first signal for the PoE circuit, and
propagate the first signal to the PoE circuit, and
the first receiver to propagate a second signal from the PoE circuit;
a transcoder connected to the first transmitter and the first receiver of the electrical transceiver,
the first receiver to amplify or filter the second signal for processing by the transcoder; and
the pluggable connection to receive the optical transceiver circuit,
the optical transceiver circuit including a second transmitter and a second receiver,
the second transmitter to provide an electrical signal to the transcoder,
the second receiver to receive an electrical signal from the transcoder.

10. The device of claim 9, further comprising an interface connected to PoE circuit.

11. The device of claim 10, where the interface includes a fiber connector.

12. The device of claim 10, where the interface connects to a port of a switch.

13. The device of claim 10, where the interface includes a RJ-45 connector.

14. The device of claim 9, where the second transmitter is to receive an optical signal from an interface, and
where the second receiver is to provide an optical signal to the interface.

15. The device of claim 9, where the optical transceiver circuit includes an optical fiber connector.

16. A device comprising:
an interface;
a power-over-Ethernet (PoE) circuit connected to the interface,
the PoE circuit to provide power, via a pluggable connection, to an optical transceiver circuit;
an electrical transceiver connected to the PoE circuit,
the electrical transceiver including a transmitter and a receiver,
the transmitter to:
amplify or filter a first signal for the PoE circuit, and
propagate the first signal to the PoE circuit, and
the receiver to propagate a second signal from the PoE circuit; and
a transcoder connected to the transmitter and the receiver of the electrical transceiver,
the receiver to amplify or filter the second signal for processing by the transcoder.

17. The device of claim 16, where the interface includes a RJ-45 connector.

18. The device of claim 16, further comprising the pluggable connection to receive the optical transceiver circuit,
the optical transceiver circuit including a second transmitter and a second receiver,
the second transmitter to provide electrical signals to the transcoder, and
the second receiver to receive electrical signals from the transcoder.

19. The device of claim 18, where the second transmitter is to receive an optical signal from an interface,
where the second receiver is to provide an optical signal to the interface, and
where the optical transceiver circuit includes an optical fiber connector.

20. The device of claim 16, where the pluggable connection is connected to the transcoder.

* * * * *